(12) United States Patent
Gardner (10) Patent No.: US 12,066,342 B2
(45) Date of Patent: Aug. 20, 2024

(54) APPARATUS FOR OBTAINING WELLBORE PRESSURE MEASUREMENTS

(71) Applicant: Ziebel AS, Tananger (NO)

(72) Inventor: Neil Gardner, Central Scotland (GB)

(73) Assignee: Ziebel AS, Tananger (NO)

( * ) Notice: Subject to any disclaimer, the term of this patent is extended or adjusted under 35 U.S.C. 154(b) by 487 days.

(21) Appl. No.: 17/272,830

(22) PCT Filed: Aug. 26, 2019

(86) PCT No.: PCT/EP2019/072728
§ 371 (c)(1),
(2) Date: Mar. 2, 2021

(87) PCT Pub. No.: WO2020/048811
PCT Pub. Date: Mar. 12, 2020

(65) Prior Publication Data
US 2021/0348501 A1    Nov. 11, 2021

(30) Foreign Application Priority Data

Sep. 3, 2018 (GB) ...................................... 1814298

(51) Int. Cl.
*G01L 1/24* (2006.01)
*E21B 17/20* (2006.01)
(Continued)

(52) U.S. Cl.
CPC ............ *G01L 1/242* (2013.01); *E21B 17/206* (2013.01); *E21B 47/01* (2013.01); *E21B 47/017* (2020.05);
(Continued)

(58) Field of Classification Search
CPC ...... E21B 47/135; E21B 47/01; E21B 47/013; E21B 47/017; E21B 17/026;
(Continued)

(56) References Cited

U.S. PATENT DOCUMENTS 4,272,472 A    6/1981   Hulin et al.
5,892,860 A *   4/1999   Maron ............... G01D 5/35383
                                                                385/38
(Continued)

FOREIGN PATENT DOCUMENTS

CA    3145585 A1 *   1/2016   ......... G01D 5/35316
EP    2725186 A1 *   4/2014   ............. E21B 17/01
(Continued)

OTHER PUBLICATIONS

PCT/EP2019/072728 International Search Report and Written Opinion dated Dec. 3, 2019 (12 pages).
(Continued)

*Primary Examiner* — Michelle R Connelly
(74) *Attorney, Agent, or Firm* — Amundsen Davis, LLC (57) ABSTRACT

The present invention concerns apparatus (1) for obtaining distributed pressure measurements in a wellbore (2), the apparatus (1) comprising: a flexible rod (10; 110) arranged to be disposed in the wellbore (2); and an elongate sensing member (15; 115) extending along the rod, the sensing member comprising at least one optical sensing fibre member (16; 116) arranged to afford a continuous length of sensing capability, wherein the sensing member extends in a groove formed in the exterior surface of the rod.

25 Claims, 6 Drawing Sheets

(51) Int. Cl.
| | |
|---|---|
| *E21B 47/01* | (2012.01) |
| *E21B 47/017* | (2012.01) |
| *E21B 47/06* | (2012.01) |
| *E21B 47/135* | (2012.01) |
| *G01D 5/26* | (2006.01) |
| *G01D 5/353* | (2006.01) |
| *G01L 11/02* | (2006.01) |
| *G01N 21/41* | (2006.01) |
| *G01N 21/47* | (2006.01) |
| *G01L 19/00* | (2006.01) |

(52) U.S. Cl.
CPC ............ *E21B 47/06* (2013.01); *E21B 47/135* (2020.05); *G01D 5/268* (2013.01); *G01D 5/353* (2013.01); *G01D 5/35358* (2013.01); *G01L 1/245* (2013.01); *G01L 1/247* (2013.01); *G01L 11/025* (2013.01); *G01N 21/41* (2013.01); *G01N 21/47* (2013.01); *G01L 2019/0053* (2013.01); *G01L 19/0092* (2013.01); *G01N 2021/4709* (2013.01)

(58) Field of Classification Search
CPC .... E21B 17/023; E21B 17/025; E21B 17/206; E21B 47/06; G01L 1/242; G01L 1/243; G01L 1/246; G01L 1/245; G01L 1/247; G01L 11/025; G01L 19/0092; G01L 2019/0053; G01D 5/268; G01D 5/353; G01D 5/35358; G01N 21/41; G01N 21/47; G01N 2021/4709
See application file for complete search history.

(56) References Cited

U.S. PATENT DOCUMENTS

| | | | |
|---|---|---|---|
| 8,973,434 B2* | 3/2015 | Albrecht | E21B 47/01 |
| | | | 73/152.57 |
| 10,843,290 B2* | 11/2020 | Vincelette | G02B 6/4413 |
| 2004/0206411 A1 | 10/2004 | Connor | |
| 2008/0271926 A1* | 11/2008 | Coronado | E21B 17/026 |
| | | | 175/325.1 |
| 2009/0003759 A1 | 1/2009 | Boyd | |
| 2010/0230094 A1 | 9/2010 | Foster et al. | |
| 2013/0071074 A1* | 3/2013 | Kurtscheid | G02B 6/443 |
| | | | 385/101 |
| 2015/0268117 A1 | 9/2015 | Challener et al. | |
| 2018/0252556 A1* | 9/2018 | Kishida | G02B 6/4416 |

FOREIGN PATENT DOCUMENTS

| | | | | |
|---|---|---|---|---|
| EP | 2725186 A1 | | 4/2014 | |
| GB | 2408528 A | * | 6/2005 | ............ A45C 13/02 |
| GB | 2492095 A | | 12/2012 | |
| GB | 2556261 A | * | 5/2018 | ........... E21B 17/003 |
| WO | 9910674 | | 4/1999 | |
| WO | WO-2010076281 A3 | * | 10/2010 | ........... E21B 17/026 |
| WO | 2011043768 | | 4/2011 | |
| WO | 2013045882 | | 4/2013 | |
| WO | 2013052543 | | 4/2013 | |
| WO | 2016179677 | | 11/2016 | |

OTHER PUBLICATIONS

Sep. 5, 2023 Examination Report received from the Canadian Patent Office for Canadian Application No. 3109166/PCT No. EP2019072728 (4 pages).

Sep. 17, 2018 United Kingdom Search Report from the UKIPO for Application No. GB1814298.4 (2 pages).

* cited by examiner

FIG. 8D

APPARATUS FOR OBTAINING WELLBORE PRESSURE MEASUREMENTS

CROSS REFERENCE TO RELATED APPLICATIONS

This application is a nationalization of and claims priority to PCT/EP2019/072728, filed on Aug. 26, 2019, which claims priority to GB1814298.4, filed on Sep. 3, 2018, the disclosures of each of which are hereby incorporated by reference in their entirety.

TECHNICAL FIELD

The present invention relates to apparatus for obtaining pressure measurements, and in particular, it relates to apparatus for use in a wellbore for obtaining measurements of pressure in the wellbore fluid, for example in a wellbore intervention operation, and related methods.

BACKGROUND

Having a good understanding of the conditions of the subsurface and the behaviour of a well is a central issue in the exploration and production of hydrocarbons through wells. Hydrocarbon recovery from long-reach wells is more common today than previously. Large sections of the wellbore may take a horizontal path through the subsurface, and in the farthest reaches of such wells, the wellbore diameter is typically very small. Such wells may also be found subsea, in deep water. Whilst it can be desirable and important to have information about the conditions in a remote well location, access can be challenging, and the availability and quality of information about the conditions of the well and the reservoir which it is sought to be exploited can often be lacking.

During the lifetime of a well, it is sometimes necessary, useful or desirable to perform intervention operations in the well, for example, to maintain or repair the well or install equipment, or for example to help to ensure that fluids can continue to be produced from the reservoir. Intervention tools may be translated into the well to perform operations in the well. During intervention operations, measurements of wellbore or subsurface parameters may also be made, and recently developed technology in connection with well intervention, particularly in difficult-to-access wells, has involved the use of a relatively stiff light-weight composite rod which is fitted with optical sensors and is moved through the wellbore so that it can obtain measurements of the subsurface. The use of the rod allows difficult long reach wells to be accessed more readily, with the ability to provide real-time measurements therefrom, both during runs in and out of the well. A rod of this kind is described for example in the patent publication WO2006/003477. Known rods have a fibre in metal tube (FIMT) placed centrally within the body of the rod, which can be employed to make distributed measurements of temperature and acoustic amplitude along the length of the wellbore, and discrete point measurements from sensors placed in a housing at the bottom end of the rod.

Whilst the rods described above have facilitated obtaining a wide range of subsurface data in long-reach wells during intervention operations, it has been found that some effects or events in the well can go unnoticed or be overlooked based on such data, and that knowledge of such effects or events can be important for making decisions, understanding the behaviour of the well, and/or determining how to operate it.

SUMMARY OF THE INVENTION

According to a first aspect of the invention, there is provided apparatus for obtaining distributed pressure measurements in a wellbore, the apparatus comprising:
a flexible rod arranged for disposal in the wellbore; and
an elongate sensing member extending along the flexible rod, the sensing member comprising at least one optical sensing fibre member arranged to afford a continuous length of sensing capability, wherein the sensing member extends in a groove formed in the exterior surface of the rod.

In this way, apparatus is provided for providing a continuous sensing capability along the length of the rod that is disposed in a wellbore, allowing measurements to be taken at multiple locations where ever required, rather than at discrete predesignated points.

The optical sensing fibre member may comprise one or more optical fibres. Such one or more optical fibres can be interrogated to provide the benefits of such a continuous sensing ability.

Preferably, the apparatus is used for obtaining distributed pressure measurements in the wellbore in an intervention operation. Accordingly, the apparatus may have a well intervention tool attached to the end of the rod.

Preferably, the sensing member is arranged to be in pressure communication and/or in contact with the wellbore fluid along the full length of the groove when the rod is in use in the wellbore such that substantially the entire length of the immersed optical sensing fibre member can perform sensing activities. Preferably, the sensing member is provided at a periphery of the rod.

Conveniently, the groove is substantially circular in cross-section. In this respect, the groove may have a diameter that is substantially the same or marginally greater than that of the sensing member, so that the sensing member can be seated within the groove, its exposed surface between the edges of the groove presenting an arcuate profile substantially flush with the rod.

Preferably, the rod has retaining means for retaining the optical fibre member along the rod.

Conveniently, the retaining means comprises containing means for at least partially containing the sensing member. The retaining means may for example comprise elements of the groove, and may be elongate with a length along the rod in which the sensing member is received. The retaining means may in this regard comprise one or more lips which are resiliently deformable to allow the sensing member to be introduced into the groove. The lips may be formed integrally into the retaining means or may be provided as one or more inserts in the groove in the retaining means. The groove and one or more lip inserts may in this regard be profiled to promote coupling of the one or more lip inserts in the groove. Each side of the groove may in this regard have an inwardly directed ridge projection for coupling with a corresponding channel in the associated lip insert.

The retaining means may comprise a length provided in parallel with the longitudinal axis of the rod. The retaining means is preferably configured to expose the optical sensing fibre member to the well fluid. The groove, conduit, recess, guide, trough, or slot or the like is preferably adapted to the sensing member, i.e. it may be adapted to the shape, configuration or dimensions of the sensing member so as to provide a close fit. The rod may be configured to keep the sensing member in fixed position on the rod, whether longitudinally (direction component along the longitudinal axis) or radially (direction component across the longitudinal axis). For example, the rod may be configured to prevent the sensing member from dislodgement axially. The rod may also be configured to protect the sensing member. For example, a body of the rod may be configured to extend at least partially around the sensing member, for protecting the sensing member or preventing dis-lodgement. The body may be configured to retain the sensing member in the groove.

The optical sensing fibre member may extend along the rod in parallel with a longitudinal axis of the rod. The optical sensing fibre member may be combined with at least one supporting structural fibre in an elongate member, wherein the elongate member extends along the rod in parallel with the longitudinal axis of the rod. The optical sensing fibre member may be twisted or braided in combination with the supporting fibre in the elongate member. The supporting fibre(s) may help to protect the optical sensing fibre member.

The optical sensing fibre member may be coated, i.e. a coating may be applied to an outer surface of the fibres, but which nonetheless allows the fibres to be in pressure communication with the fluid in the wellbore. The optical fibre member is preferably arranged to respond to a pressure in the well, e.g. it may physically deform, and may be interrogated using optical interrogation means at the surface, whereby an optical response can be indicative of pressure in the wellbore, in particular the wellbore fluid.

A material of the rod preferably comprises a composite material, for example the material of the rod may comprise carbon fibres. Accordingly, the rod may be a composite rod, e.g. a carbon composite rod. The composite material may further comprise a polymer matrix, in which the carbon fibres are preferably embedded. The rod may thus comprise a body of the composite material, and the containing means may be provided in the periphery of the body of the rod.

In a preferred example of the present invention, a 15 mm diameter carbon composite rod has a tensile strength of 11,500 to 12,500 Kgs, a minimum bend radius (at break) of 1.05 to 1.10 metres and a Young's Modulus of 115 to 120 GPa.

The rod may have at least one electrical conductor in a core of the rod, which may extend along the rod between first and second ends. Typically, the rod may have at least one optical fibre in a core of the rod, for example by means of a FIMT arrangement. The optical fibre in the core may extend along the rod between first and second ends. The optical fibre may be provided inside a metal tube in the core of the rod. The rod may include a FIMT within the body of the rod, preferably centrally and more preferably co-axially with the longitudinal axis the rod. Thus, in particular embodiments the composite material is disposed between the FIMT and the periphery of the rod.

According to a second aspect of the invention there is provided a rod for use in a wellbore for obtaining distributed pressure measurements, the wellbore containing wellbore fluid, the rod having an elongate retaining means for retaining an elongate sensing member, the elongate sensing member comprising at least one optical sensing fibre member for sensing a pressure in the wellbore fluid, the retaining means comprising a groove formed in the exterior surface of the rod and being configured to communicate wellbore fluid pressure to the optical sensing fibre member along its length within the retaining means.

The rod comprises a body configured to receive or contain the optical sensing fibre member therein, along the periphery of the rod. In certain embodiments, the body is configured to contain the elongate pressure sensing member which may include the optical fibre member, for example in combination with supporting fibres. The groove is preferably adapted to the optical fibre member, i.e. it may be adapted to the shape, configuration or dimensions of the optical fibre member so as to provide a close fit. The rod may be configured to keep the optical sensing fibre member in fixed position on the rod, whether longitudinally (direction component along the longitudinal axis) or radially (direction component across the longitudinal axis). For example, the rod may be configured to prevent the optical sensing fibre member from dislodgement axially. The rod may also be configured to protect the optical sensing fibre member. For example, the body may be configured to extend at least partially around the optical fibre member or the elongate pressure sensing member.

A material of the rod, or more specifically the body of the rod, may comprise a composite material. For example, the material may comprise carbon fibres. Accordingly, the rod may be a composite rod, e.g. a carbon composite rod. The composite material may further comprise a polymer matrix, in which the carbon fibres are preferably embedded. The rod may thus comprise a body of the composite material, and the containing means may be provided in the periphery of the body of the rod.

In addition, the apparatus and/or rod of the respective first and second aspects can be used for performing other measurements in the wellbore, and to this end may include further optical fibres and may be provided with optical sensors attached to the end of the rod, for obtaining measurements downhole. Such measurements may include pressure, temperature and vibration measurements, which may be single point measurements. Such measurements may further include distributed acoustic measurements and distributed temperature measurements along the rod. An individual optical fibre may be provided inside and along the rod, for each such measurement.

The rod is preferably configured to be spooled into and out of the wellbore from a drum. Thus, the rod may be considered a coiled rod, which uncoils as it is deployed, for example in an intervention operation, in the wellbore. Once in the wellbore, the rod can be pushed along following the wellbore trajectory, for example until frictional forces can no longer be overcome.

According to a third aspect of the invention, there is provided a method of using the apparatus of the first aspect or the rod of the second aspect in a wellbore for obtaining distributed pressure measurements, the method comprising the steps of:— inserting the rod or apparatus into a wellbore;

transmitting light into and/or along the optical sensing fibre member, to interrogate the optical sensing fibre member; and detecting backscattered light from the optical sensing fibre member.

The method may be a method of performing a wellbore intervention operation, using said apparatus and/or rod.

The method may include providing the rod in a coiled configuration on a drum. The method may further include spooling the rod off the drum. The spooling is preferably performed continuously to translate the rod into and/or along the wellbore. In this way, during deployment of the rod in the wellbore, a first portion of the rod may be coiled on the drum, and a second portion of the rod may be disposed in the wellbore, having been uncoiled from the drum. When disposed in the wellbore, the optical sensing fibre can be interrogated to obtain distributed measurements of pressure in the well fluid. More specifically, the measurements may be obtained at locations along the second portion of the rod.

According to a fourth aspect of the invention, there is provided a method of making the apparatus of the first aspect or the rod of the second aspect, the method comprising the steps of:— forming a rod with a longitudinal groove;

inserting at least one sensing member into said groove; and retaining the sensing member within the groove by way of one or more retaining lips afforded to the open ends of the groove.

Preferably, the sensing member is inserted into the groove by way of an inserting tool having a pair of wedge elements for gradually widening the groove to an insertion point, where the sensing member is introduced between the wedge elements into the groove.

Conveniently, the rod and sensing member are wound onto a wheel, the inserting tool being provided at the periphery of the wheel.

The rod may be made using a pultrusion process in order to form the rod. The method may include embedding carbon fibres in a matrix of polymer in order to form a body of the rod. The method may further include providing, for example, containing means in the rod in which the optical sensing fibre can be at least partially enclosed.

Any of the above aspects of the invention may include further features as described in relation to any other aspect, wherever described herein. Features described in one embodiment may be combined in other embodiments. For example, a selected feature from a first embodiment that is compatible with the arrangement in a second embodiment may be employed, e.g. as an additional, alternative or optional feature, e.g. inserted or exchanged for a similar or like feature, in the second embodiment to perform (in the second embodiment) in the same or corresponding manner as it does in the first embodiment.

Embodiments of the invention can be advantageous in several respects. For example, distributed pressure data can be obtained through use of the rod, where this has previously been lacking for example in intervention operations, in particular where a long reach capability is sought. Advantageously, the distributed pressure measurements which may be obtained can allow one to improve wellbore imagery and diagnostics, and obtain an improved understanding of well and reservoir behaviours. Such measurements may also be utilised to determine the effectiveness and impact of intervention operations upon the well and/or reservoir behaviour. The distributed pressure measurements, well intervention operations, and other kinds of wellbore measurements, can all be carried out in the same trip in the wellbore, for example within a run-in or a trip-out of the wellbore.

Various further advantages of the invention and its features are described and/or will be apparent from the specification throughout.

DESCRIPTION AND DRAWINGS

There will now be described, by way of example only, embodiments of the invention with reference to the accompanying drawings, in which.

Figure 1:
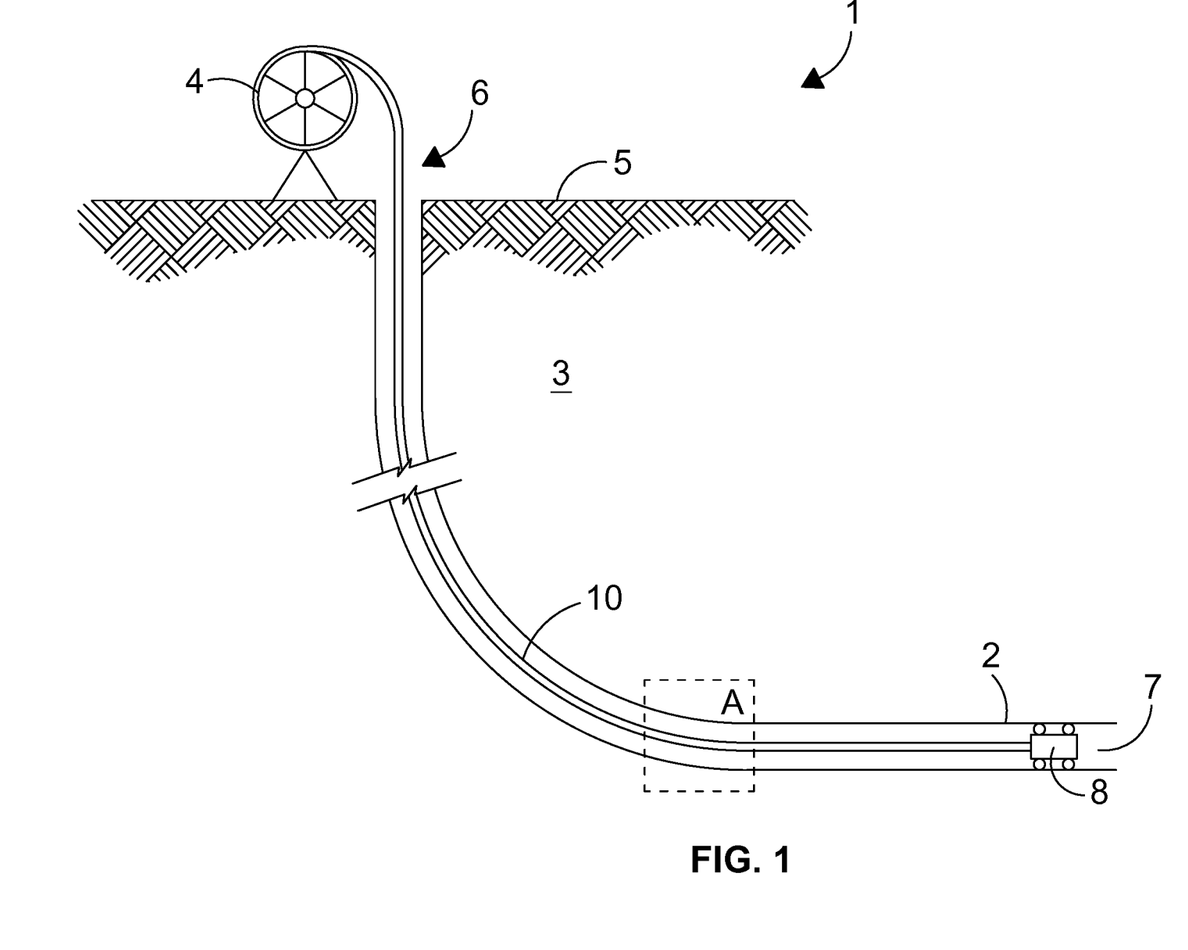
FIG. 1 is a schematic representation apparatus deployed in a wellbore according to an embodiment of the invention.

With reference first to FIG. 1, apparatus 1 for obtaining pressure measurements in a wellbore 2 is shown. The apparatus 1 includes a rod 10 which is disposed in the well-bore 2 where it is surrounded by well fluid. The rod 10 is provided with an optical sensing fibre (not visible in FIG. 1), which will be described in further detail below, but it can be noted that the optical sensing fibre is arranged on the rod 10 to be in pressure communication with the fluid along its length so that the fibre can sense the pressure in the well fluid along substantially the full length of the rod 10 at any point along the length of the rod.

The rod 10 is generally cylindrical in form, and is slim and elongate such that it can bend to follow the deviated trajectory of the wellbore 2. The rod 10 is provided as a continuous length and is fed into the wellbore 2 by spooling it out progressively from a drum 4 provided at the surface 5. Thus, the rod 10 is sufficiently flexible to be bent around the drum 4. Nonetheless, the rod 10 is designed to have a certain stiffness to allow the rod 10 to be pushed from an upper, surface end 6 to help control and move the rod 10 through the wellbore. The rod 10 is stiff enough to be pushed along into horizontal sections of the wellbore 2 until frictional forces cannot be overcome. The reach limits by pushing are determined by the internal diameter of the wellbore tubing (e.g. casing, lining, or the like), the condition and roughness of the internal surface of such tubing, and the amount of debris in the hole. The rod 10 is also constructed so as to have significant tensional strength, so that when operating in far reaches of a well, it can carry large axial loads, as may be imparted by virtue of the weight of the rod 10 itself and any equipment attached thereto. Toward the lower, bottom-hole end 7, the wellbore 2 takes an increasingly lateral trajectory into a substantially horizontal section of the wellbore 2. A wellbore intervention tool 8 is attached to the rod at the far end 7, for performing well intervention operations. In particular variants, a rod of the type disclosed in patent publication WO2012/067516 can be used in order to reduce friction forces experienced by the rod.

Figures 2A, 2B:
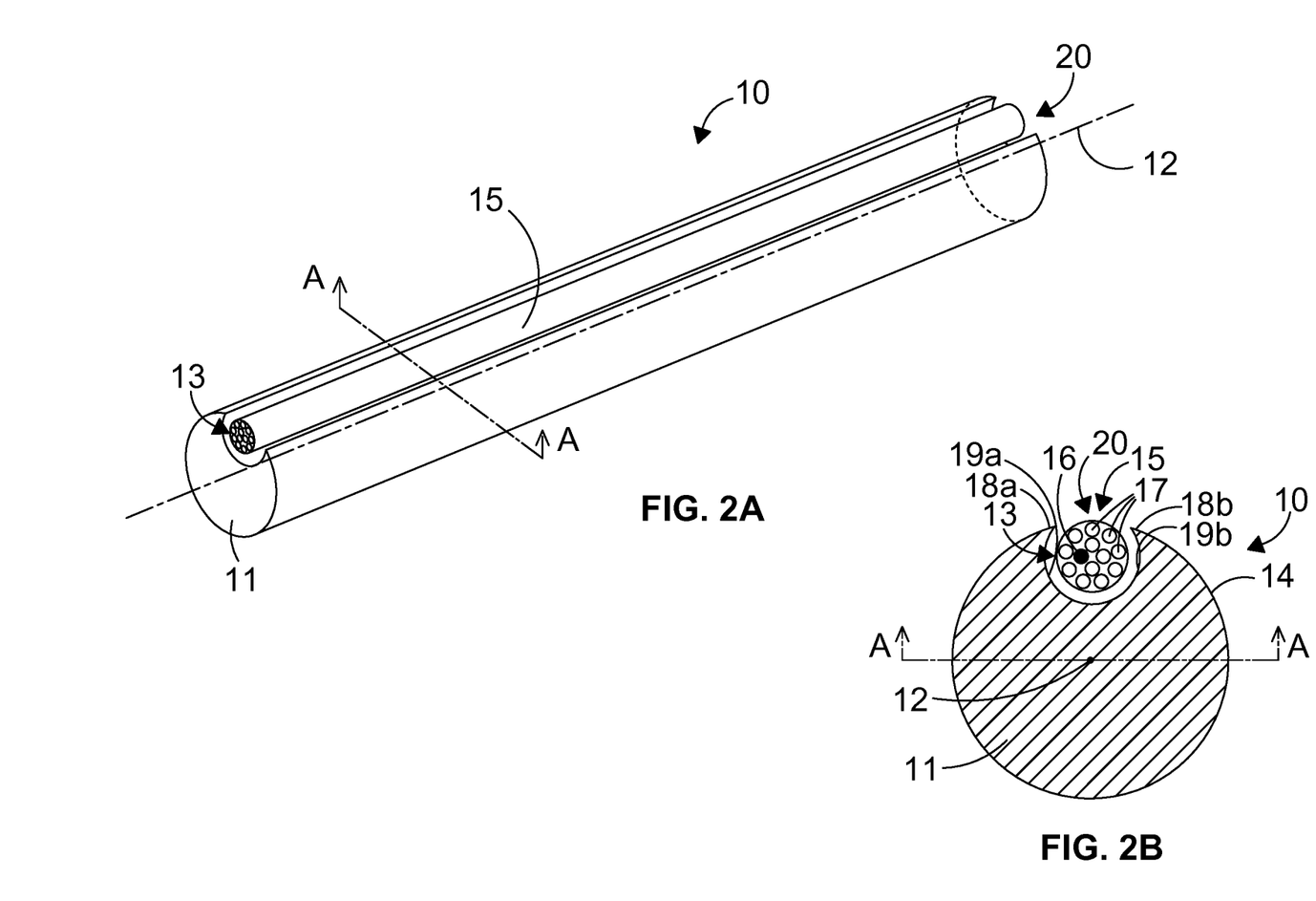
FIG. 2A is a larger scale perspective representation of a section of the apparatus of FIG. 1 in the window A.
FIG. 2B is a larger scale cross-sectional representation of the section of FIG. 2A along the line AA.
Figure 4:
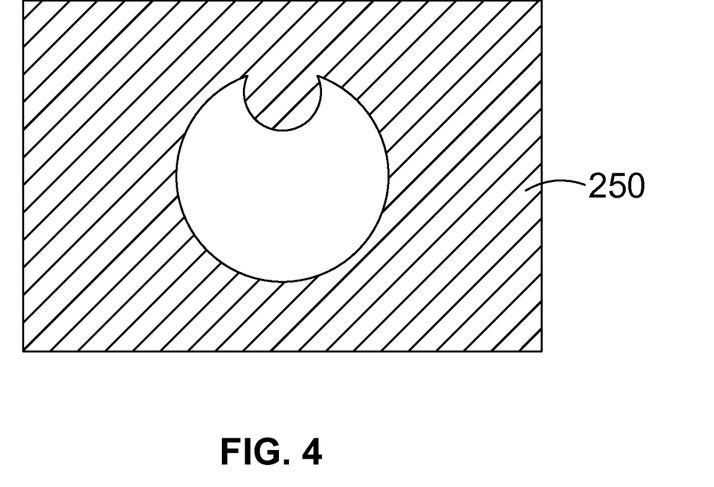
FIG. 4 shows a forming die for use in forming a rod according to the present invention.

Referring now to FIGS. 2A and 2B, the rod 10 is described in further detail. As can be seen, the rod 10 has an elongate body 11, having a length along a longitudinal axis 12 of the rod 10. Moreover, the rod 10 is generally cylindrical about the longitudinal axis 12, and the longitudinal axis 12 as shown in FIGS. 2A and 2B, extends centrally through the body 11 in the core of the rod 13. A die 250, as shown in FIG. 4, may be used to form the rod from suitable materials using a pultrusion process.

The body 11 is provided with receiving means for the optical sensing member in the form of a conduit or groove 13, at the periphery of the rod 10. The conduit 13 is provided in an outer surface 14 of the body 11, and depends inwards from the outer surface 14 toward the core, so as not to cause any outward protrusion from the rod 10. The conduit 13 extends axially along the body 11, and thus also along the rod 10, in parallel with the longitudinal axis 12. Thus, the conduit 13 does not turn about the axis 12 along its length, although other variants are possible where a conduit turns about the axis 12, for example by taking a spiral path along the rod 10.

An elongate pressure sensing member 15 is provided in the conduit 13, and includes one or more optical fibres 16 for sensing pressure along the length of the rod and obtaining distributed pressure measurements. More specifically, the optical fibres 16 are provided as a continuous length along the rod 10, from the upper end 6 to the lower end 7, and are arranged so that they are affected by well fluids when the rod is disposed in the wellbore 2.

The conduit 13 is open to the wellbore fluid, allowing communication between the well fluid and the optical fibres 16 residing in the conduit 13. More specifically, the wellbore fluid is allowed to come into contact with the optical fibre 16 and/or pressure sensing member 15, causing slight deformation of the sensing member in dependence upon the pressure in the wellbore fluid.

In this way, if the pressure in the well fluid at a particular location along the rod 10 changes, the optical fibres 16 can sense the change in pressure. It should also be appreciated that the optical fibres 16 can be used in obtaining specific pressure values for the wellbore fluid pressure, in a distributed fashion, at multiple locations along the rod.

Distributed pressure measurements from the optical fibres 16 can be implemented using an optical interrogator (not shown) at the surface. The interrogator is arranged to send light through the optical fibre 16 and receive back measurable backscattered light in response. When there is a change in pressure in the well fluid, the optical fibre 16 responds by deforming somewhat, leading to a change in the light path in the optical fibre 16, which in turn changes the signal in the backscattered light. The light propagates along the full length of the optical fibre, and as such the backscattered light received at different time delays can be associated with different travel times, and thus be associated with different distances or measurement locations along the optical fibre 16. The backscattered light data can be processed to provide measurements for numerous locations. For example, a resolution of up to one measurement every metre along the fibre could be feasible.

Suitable optical interrogators are widely and commercially available for example through OptaSense Ltd. Techniques for handling data for obtaining distributed pressure determinations from optical fibre sensing are published and marketed by Neubrex Co. Ltd, and the construction of the sensing member and method of making this measurement are disclosed and described in Japanese patent JP 507575562.

The pressure sensing member 15 in this embodiment also includes a number of supporting fibres 17. The supporting fibres 17 can help to support and protect the optical fibres 16. The optical fibres 16 and the supporting fibres 17 are twined together along the sensing member 15. In this way, the optical sensing member 15 can be considered to have the form of a rope or wire comprising intertwined fibres incorporating the optical fibres 16. The optical fibres 16 therefore have a spiral path along the recess 13, whilst the recess extends along the rod in parallel with the axis 12. The pressure sensing member 15 is nonetheless configured such that the optical fibres 16 have good contact and pressure communication with the well fluid along the rod 10, so as to allow distributed pressure measurements to be made. In other variants, an optical fibre can have a non-spiral path along the conduit 13 where it is provided as a central member in the core of a pressure sensing member and supporting fibres are twined about the optical fibre. In yet other variants, the pressure sensing member can have several optical fibres.

It can be noted also that the rod 10 is configured to hold the optical fibre in place. To do so, the rod 10 may have retaining means in the form of lips 18a, 18b which act to trap the pressure sensing member 15 in the conduit 13. The lips 18a, 18b extend from first and second wall portions 19a, 19b of the conduit 13, partially around a circumference of the pressure sensing member 15. The well fluid is free to access and come into contact with the pressure sensing member 15 through a gap 20 defined between the lips 18a, 18b. In other words, the pressure sensing member 15 is exposed to the surroundings of the rod 10 through the gap 20, whilst still being held in place radially by the lips 18a, 18b. The lips 18a,18b, by virtue of them curving around the pressure sensing member to a certain extent, can also help to protect the pressure sensing member 15. The pressure sensing member 15 is held in the conduit 13 so as to comply with the overall cylindrical shape of the rod. Thus, the elongate pressure sensing member 15 does not protrude radially outwardly beyond the outer surface 14 of the body 11 of the rod 13.

Figure 5A:
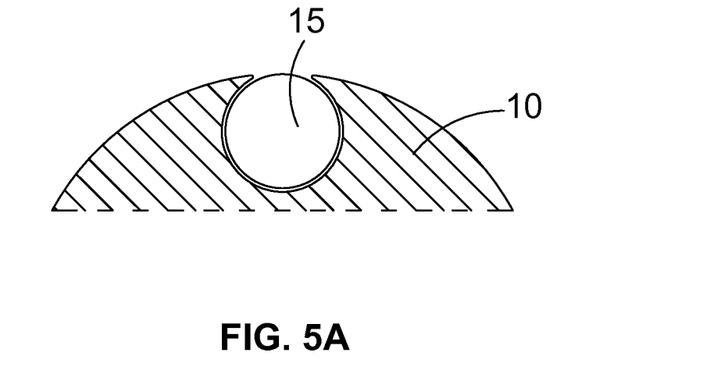
FIGS. 5A and 5B show cross-sectional views through alternative embodiments of a rod and inserted sensing member according to the present invention.

Other provisions can be made to keep the pressure sensing member 15 in place. For example, whilst the lips may be integral to the rod material as shown in FIG. 5A, the retaining means can in other embodiments comprise retaining members such as lip inserts, thin strips or protruding members to trap the pressure sensing fibre in place and/or to ensure that the pressure sensing member 15 is kept in fixed position against the body 11.

Figure 5B:
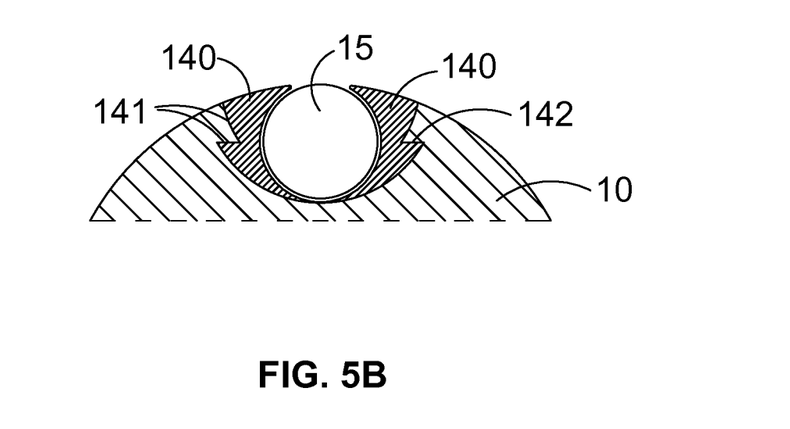

In the case of lip inserts 140 as shown in FIG. 5B, the inserts may be profiled to enhance retention within the rob groove. To this end the lip inserts 140 may have a channel 141 for receiving an inwardly projecting ridge 142 in the side of the grove.

In certain variants, a specific retaining means other than the groove may not be necessary, where the pressure sensing member 15 is embedded in the fabric of the body 11 of the rod along the periphery, or where the pressure sensing member is adhered or fused to the body 11. In such variants however, communication means by which the optical fibres 16 have pressure communication with the well fluid is however still necessary, to sense the pressure in the well fluid. Such communication means can for example include one or more of the groove, gaps, slots or ports or the like in the body of the rod to expose the member 15 to well fluid, such that distributed pressure measurements can be obtained. In any case, the optical sensing member 15 is to be arranged on the rod, so that the optical fibres 16 are provided along the length of the rod 10 and can have communication with the well fluid along the length of the rod, so that distributed pressure measurements along the rod 10 can be obtained by way of the fibres 16.

The body 11 of the rod 10 described in the example above comprises a composite material comprising longitudinal carbon fibres bound together in a polymer matrix. This provides the rod 10 with high tensional strength and low weight. The resulting rod 10 is also semi-stiff and it also has no deformational "memory", which means that the rod can be coiled on a drum causing it to bend (for example 4.2 m or 3.5 m diameter), but when uncoiled it will straighten back naturally without trying to hold on to its previous bent configuration, unlike steel coiled tubing or wires. Thus, the rod 10 deforms elastically, returning to its former shape when the forces which caused it to bend are re-moved. These features facilitate insertion and movement of the rod 10 through the wellbore 2 into the far reaches of a well. A continuous composite rod of this type can readily be deployed to reach distances of up to 6 km or more along the wellbore, where it can be used in obtaining measurements and performing well intervention operations.

The composite rod has unusual strength in tension due to the arrangement of unidirectional (UD) carbon fibres aligned with its length, but will bend into a coil fairly readily, and at 90 degrees to the carbon fibre direction (i.e. across the rod) the strength is due to the epoxy matrix that holds the composite together.

In one preferred example of the present invention, a 15 mm diameter carbon composite rod has a tensile strength of 11,500 to 12,500 Kgs, a minimum bend radius (at break) of 1.05 to 1.10 metres and a Young's Modulus of 115 to 120 GPa.

Figures 3A, 3B:
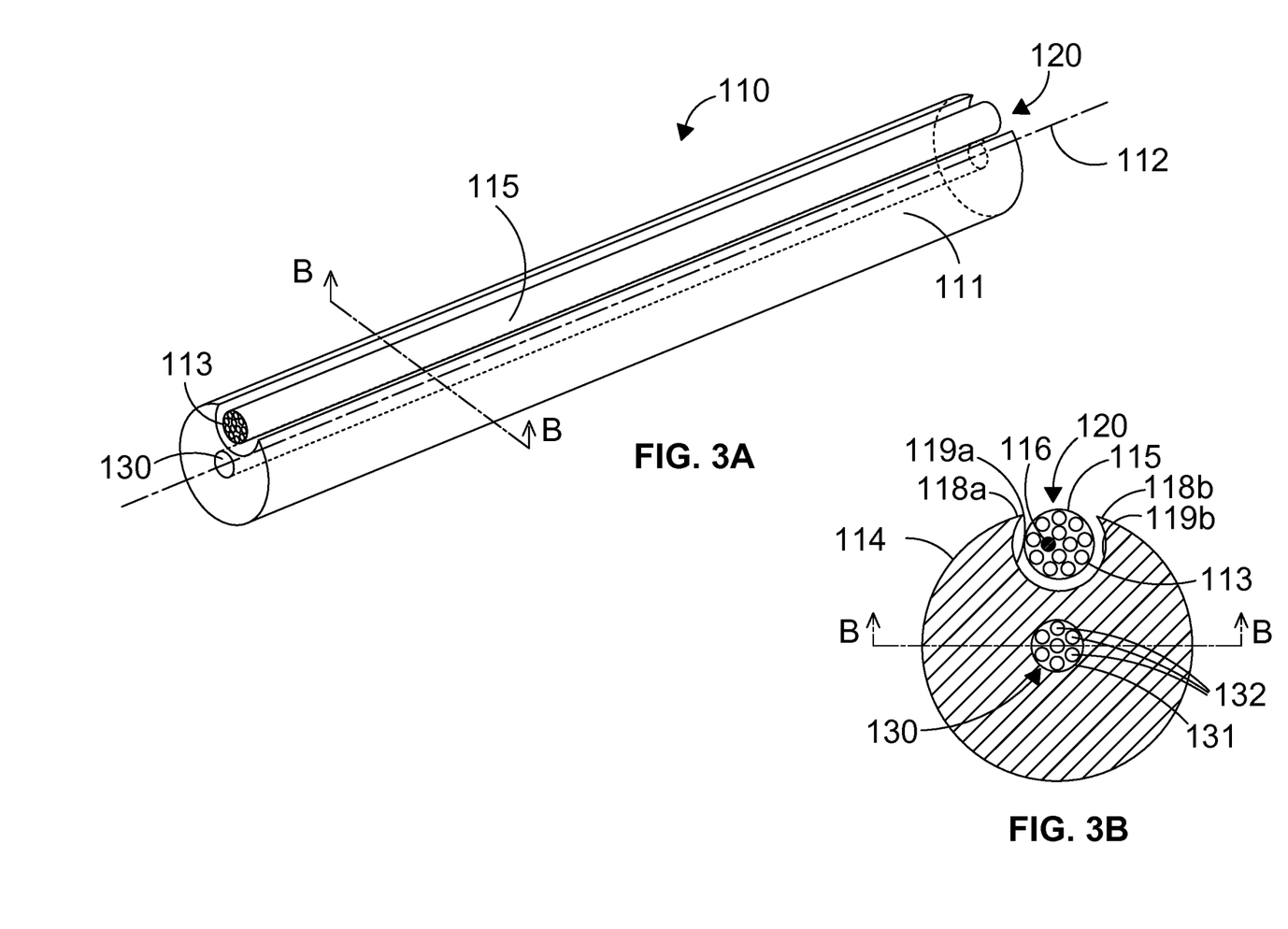
FIG. 3A is a perspective representation of a section of an apparatus for deployment in a wellbore according to another embodiment of the invention.
FIG. 3B is a larger scale cross-sectional representation of the section of FIG. 3A along the line BB.

Turning now to FIGS. 3A and 3B, a rod 110 is described. The rod 110 is similar in many respects to the rod 10 as described above. As such, features of the rod 110 which are like those of rod 10 are referenced with the same numerals, but incremented by one-hundred. The rod 110 is provided with a pressure sensing member 115 which extends along the rod in a conduit 113 along the outside of the rod 115. The rod 110 has longitudinal gap 120 providing access to the conduit 113, and through which the optical fibres 116 are exposed to the well fluid, when in use.

The rod 110 is the same as the rod 10, except that the rod 110 additionally has a fibre in metal tube (FIMT) 130 arranged in the core of the rod 110, within the body 111. As can be seen, the FIMT 130 has a length extending through the rod 110, along the longitudinal axis 112. The FIMT 130 has an outer metal tube 131 with six optical fibres 132 provided inside the tube 131. The optical fibres 132 follow along the inside of the tube 131 along the full length of the rod 110. The optical fibres 132 include two multi-mode fibres and four single-mode fibres, wherein these can be used for making measurements in the wellbore, as follows:

one optical fibre 132 can be used for making a point measurement of the well-bore fluid pressure at a bottom-hole end of the rod 110;

one optical fibre 132 can be used for making a point measurement of temperature with an optical sensor at a bottom-hole end of the rod 110;

one optical fibre 132 can be used for making a vibration measurement with an optical sensor at a bottom-hole end of the rod 110;

one optical fibre 132 can be used for obtaining a distributed acoustic measurement along the length of the rod 110; and two optical fibres 132 can be used for obtaining a distributed temperature measurement along the length of the rod 110.

By obtaining a distributed measurement of pressure in the wellbore along the rod as provided for by the present invention, data can be obtained along the length of the rod for a plurality of locations distributed along the rod and hence for plurality of locations along the wellbore, at any one measurement instance (for example every 1 m). The measurements of the pressure in the well fluid can be obtained at locations in the wellbore near the surface, or in general any location along the optical sensing fibre or rod between the surface and the end of the rod. This is in contrast to prior art point measurements, where measurements have been confined to the location at the end of the rod or at specific predetermined locations along the rod. As a result, the data obtained during an operation using a rod in the well is enhanced, allowing better monitoring, identification of events, and understanding of the behaviour of the well.

Figure 6:
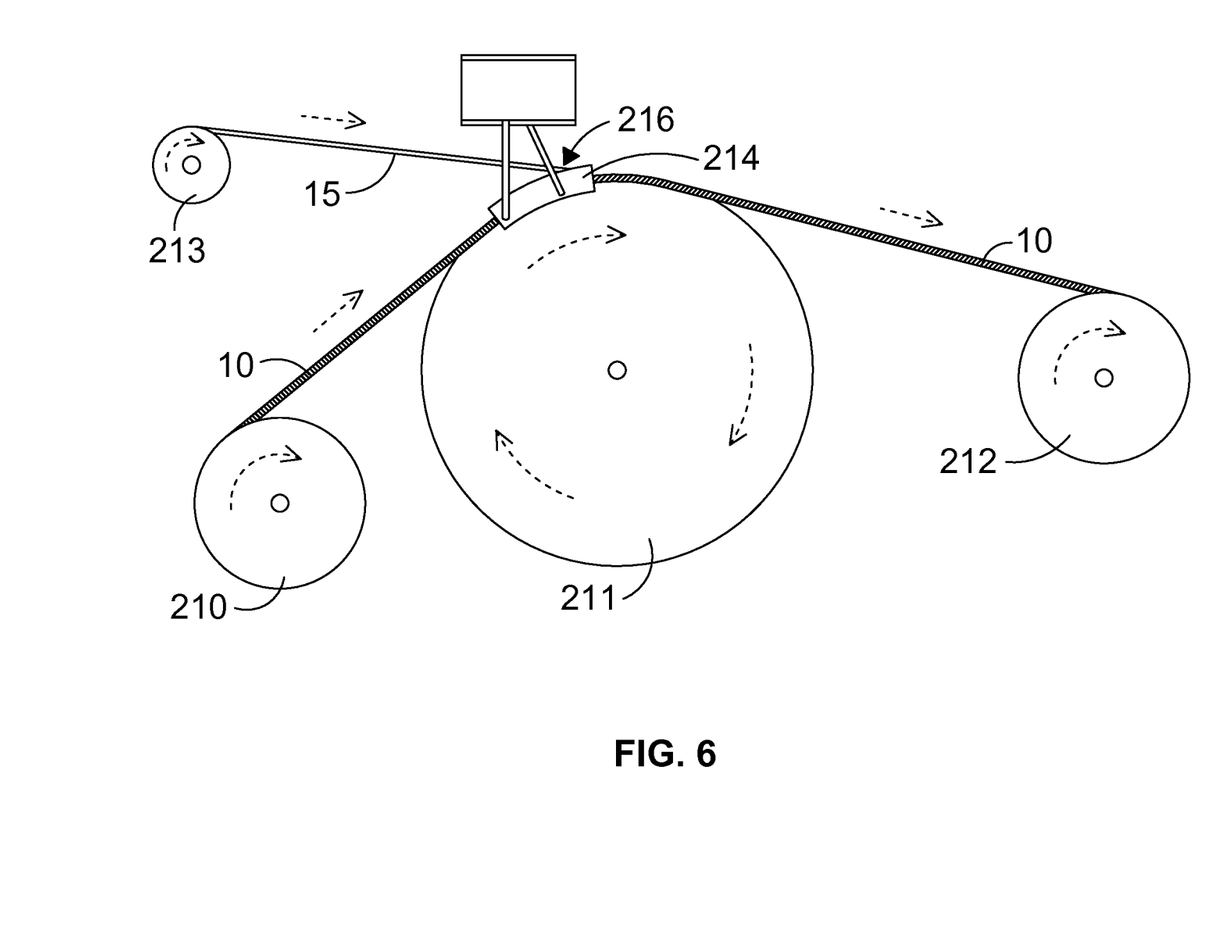
FIG. 6 shows apparatus used for inserting a sensing member into a rod according to the present invention.

FIG. 6 shows apparatus 200 for introducing the sensing member 15 into the groove 13 of the rod 10. In this regard, the rod is fed from a drum 210 over a inserting wheel 211 and onto a further drum 212.

Figure 7:
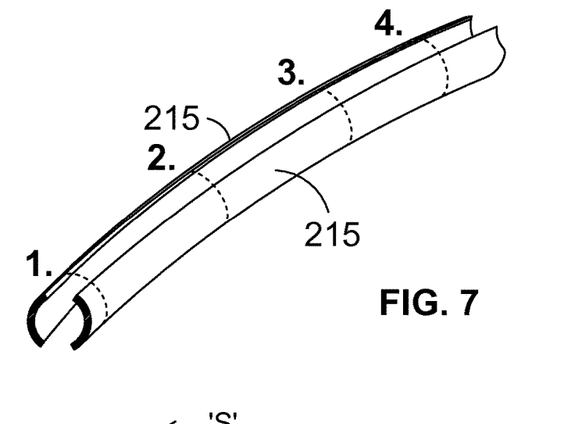
FIG. 7 shows a perspective view of a parting tool from the apparatus of FIG. 6.
Figure 8A:
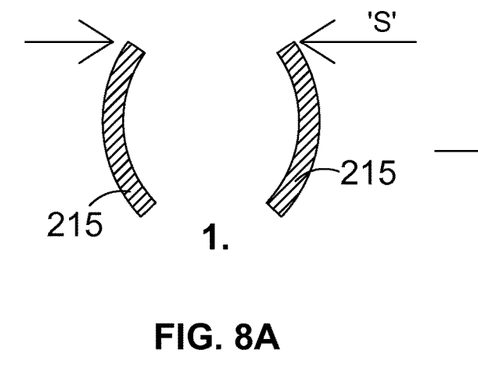
FIGS. 8A to 8D show cross-sectional views of the parting tool shown at positions 1 To 4 of FIG. 7.
Figure 8B:
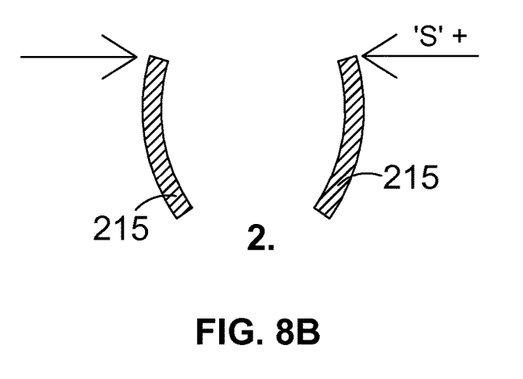
Figures 8C, 8D:
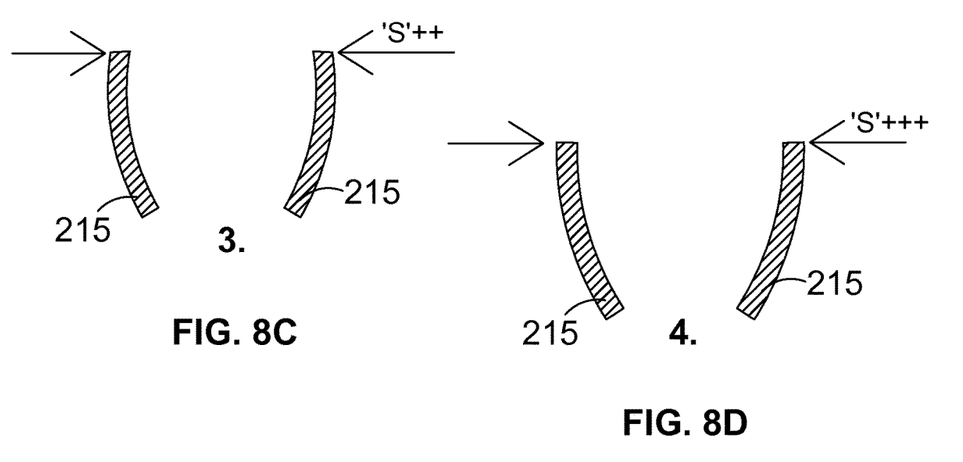

Sensing member 15 is fed from a drum 213, through an inserting tool 214 provided over a section of wheel 211. The inserting tool comprises a pair of wedge elements 215 whose spacing at their upper edges gradually increases along the length of the tool. As shown in FIGS. 8 A to 8D, the upper edge spacing gradually increases from point 1 to point 4 shown in FIG. 7. The spacing 's' of the upper edges increases from 's' to 's' +++ along the extent of the wedge elements from location 1 to location 4. The wedge elements are positioned such that they extend into the groove 13 at point 1. As the rod 10 is drawn by wheel 211 from drum 210, the wedge element gradually widens the groove so that at the point 216 (i.e. location 4 of FIG. 7) the sensing member 15 is introduced onto the wheel 211, it slips neatly into the opened groove of the rod. Once past the point 216, the wedge elements no longer keep the groove 13 open and its lips spring back elastically to trap the sensing member in place on the rod 10. The combined rod and sensing member are wound onto drum 212, ready for use.

Various modifications and improvements may be made without departing from the scope of the invention herein described.

What is claimed is:

1. An apparatus for obtaining distributed pressure measurements in a wellbore, the apparatus comprising:
a flexible rod arranged to be disposed in the wellbore; and
an elongate sensing member extending along the rod, the sensing member comprising at least one optical sensing fibre member arranged to afford a continuous length of sensing capability, wherein the sensing member extends in a groove formed in the exterior surface of the rod;
wherein the optical sensing fibre member is combined with at least one supporting fibre in an elongate sensing member, wherein the elongate sensing member is provided along the rod in parallel with the longitudinal axis of the rod; and
wherein the optical sensing fibre member is twisted or braided in combination with the supporting fibre in the elongate sensing member.

2. The apparatus as claimed in claim 1, wherein the sensing member is arranged to be in communication with wellbore fluid along the full length of the groove for measuring pressure when the rod is in use in the wellbore.

3. The apparatus as claimed in claim 1, wherein the sensing member is provided at a periphery of the rod.

4. The apparatus as claimed in claim 1, wherein the rod has retaining means for retaining the sensing member along the rod within the groove.

5. The apparatus as claimed in claim 4, wherein the retaining means takes the form of containing means for at least partially enclosing the sensing member.

6. The apparatus as claimed in claim 1, wherein the groove is substantially circular in cross-section.

7. The apparatus as claimed in claim 1, wherein the groove has one or more lips for retaining the sensing member within the groove.

8. The apparatus as claimed in claim 7, wherein the one or more lips are resiliently deformable to allow the sensing member to be introduced into the groove.

9. The apparatus as claimed in claim 7, further comprising one or more insert strips for applying to the groove to form said one or more lips for retaining the sensing member.

10. The apparatus as claimed in claim 1, wherein the sensing member is fixed to the rod using adhesive.

11. The apparatus as claimed in claim 1, wherein the rod is a 15 mm diameter carbon composite rod.

12. The apparatus as claimed in claim 1, wherein the optical sensing fibre member comprises a coated optical sensing fibre.

13. The apparatus as claimed in claim 1, wherein the optical sensing fibre member is arranged to respond to a pressure in the well, and to be interrogated using interrogation means at the surface, whereby an optical response is indicative of pressure.

14. The apparatus as claimed in claim 1, wherein the rod is formed of a flexible material.

15. The apparatus as claimed in claim 1, wherein a material of the rod comprises carbon fibres.

16. The apparatus as claimed in claim 1, wherein the rod is a 15 mm diameter carbon composite rod having a tensile strength of 11,500 to 12,500 Kgs, a minimum bend radius (at break) of 1.05 to 1.10 metres and a Young's Modulus of 115 to 120 GPa.

17. The apparatus as claimed in claim 1, wherein the rod comprises a coiled rod arranged to be coiled on a drum in a storage configuration.

18. The apparatus as claimed in claim 1, wherein the rod has at least one optical fibre in a core of the rod, the optical fibre in the core extending along the rod between first and second ends.

19. The apparatus as claimed in claim 18, wherein said optical fibre is provided inside a metal tube in the core of the rod.

20. A rod for use in a wellbore for obtaining distributed pressure measurements, the wellbore containing wellbore fluid, the rod having an elongate retaining means for retaining an elongate sensing member, the elongate sensing member comprising at least one optical sensing fibre member for sensing a pressure in the wellbore fluid, the retaining means comprising a groove formed in the exterior surface of the rod and being configured to communicate wellbore fluid pressure to the optical sensing fibre member along its length within the retaining means;

wherein the optical sensing fibre member is combined with at least one supporting fibre in an elongate sensing member, wherein the elongate sensing member is provided along the rod in parallel with the longitudinal axis of the rod; and wherein the optical sensing fibre member is twisted or braided in combination with the supporting fibre in the elongate sensing member.

21. A method of using the rod as claimed in claim 20 in a wellbore for obtaining distributed pressure measurements; the method comprising the steps of:

inserting the rod or apparatus into a wellbore;

transmitting light into and/or along the optical sensing fibre member, to interrogate the optical sensing fibre member; and detecting backscattered light from the optical sensing fibre member.

22. A method of making the rod as claimed in claim 20, the method comprising the steps of:

forming a rod with a longitudinal groove;

inserting at least one sensing member into said groove;

retaining the sensing member within the groove by way of one or more retaining lips afforded to the open ends of the groove.

23. A method as claimed in claim 22, wherein the sensing member is inserted into the groove by way of an insertion tool having a pair of wedge elements for gradually widening the groove to an insertion point, where the optical sensing fibre is introduced between the wedge elements into the groove.

24. A method as claimed in claim 23, wherein the rod and sensing member are wound onto a wheel, the insertion tool being provided at the periphery of the wheel.

25. A method as claimed in claim 22, wherein the retaining lips are inserts that are adhered to the sides of the groove after insertion of the sensing member.

* * * * *